(12) United States Patent
Cairo

(10) Patent No.: US 7,322,798 B2
(45) Date of Patent: Jan. 29, 2008

(54) HIGH STRUCTURAL EFFICIENCY BLADES AND DEVICES USING SAME

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 83 days.

(21) Appl. No.: 11/271,096

(22) Filed: Nov. 10, 2005

(65) Prior Publication Data

US 2007/0104584 A1    May 10, 2007

(51) Int. Cl.
 *F03D 11/00* (2006.01)
(52) U.S. Cl. .............. 416/229 R; 416/232; 416/241 A; 416/210 R
(58) Field of Classification Search ............ 416/229 R, 416/232, 233, 241 R, 241 A, 210 R
See application file for complete search history.

(56) References Cited

U.S. PATENT DOCUMENTS

| | | | | |
|---|---|---|---|---|
| 2,637,405 A | * | 5/1953 | Stanley | 416/226 |
| 2,961,053 A | * | 11/1960 | Prewitt et al. | 416/226 |
| 4,339,230 A | * | 7/1982 | Hill | 416/226 |
| 5,547,629 A | * | 8/1996 | Diesen et al. | 264/257 |
| 6,942,461 B2 | * | 9/2005 | Wobben | 416/210 R |

* cited by examiner

*Primary Examiner*—Ninh H. Nguyen
(74) *Attorney, Agent, or Firm*—James E. McGinness; Armstrong Teasdale LLP

(57) ABSTRACT

A blade for a rotor has integral stiffeners with at least one of unidirectional caps configured to carry blade bending loads in axial tension or webs to carry transverse shear resulting from blade bending.

20 Claims, 4 Drawing Sheets

HIGH STRUCTURAL EFFICIENCY BLADES AND DEVICES USING SAME

BACKGROUND OF THE INVENTION

This invention relates generally to blade structure and more particularly to blade structures that offer stiffness and structural strength, and to uses of such blades. Such blades are particularly suitable for (but are not limited to use in) wind turbine configurations.

Contemporary blades are made from fiberglass/epoxy composite material using monolithic, un-stiffened geometry. As a result, blades have thick, heavy, skins. If substantial care is not taken in processing, thick section laminates can be subject to porosity and delamination problems.

BRIEF DESCRIPTION OF THE INVENTION

One aspect of the present invention therefore provides a blade for a rotor. The blade has integral stiffeners with at least one of unidirectional caps configured to carry blade bending loads in axial tension or webs to carry transverse shear resulting from blade bending.

In another aspect, the present invention provides a wind turbine having a generator, a hub, and at least one blade having integral stiffeners. The integral stiffeners include at least one of unidirectional caps configured to carry blade bending loads in axial tension or webs to carry transverse shear resulting from blade bending.

It will be seen that many configurations of the present invention can reduce blade weight at tops of towers while giving the designer several ways to adjust the strength and stiffness of blades to achieve improved structural performance.

DETAILED DESCRIPTION OF THE INVENTION

In some configurations of the present invention, integrally stiffened skin construction is used to replace prior art monolithic skin construction for wind turbine blades. Blade stiffness and structural strength are improved by geometry changes that are compatible with laminated composite material processing/fabrication. Improved structural efficiency results in reduced blade weight and material usage. When these blade configurations are used on wind turbines, a lighter weight hub results as does a lower tower weight at the top of the tower, both of which reduce structural requirements for the tower. Also provided in some configurations is a more robust, damage tolerant, attachment coupling for joining the blade to a hub.

Figure 1:
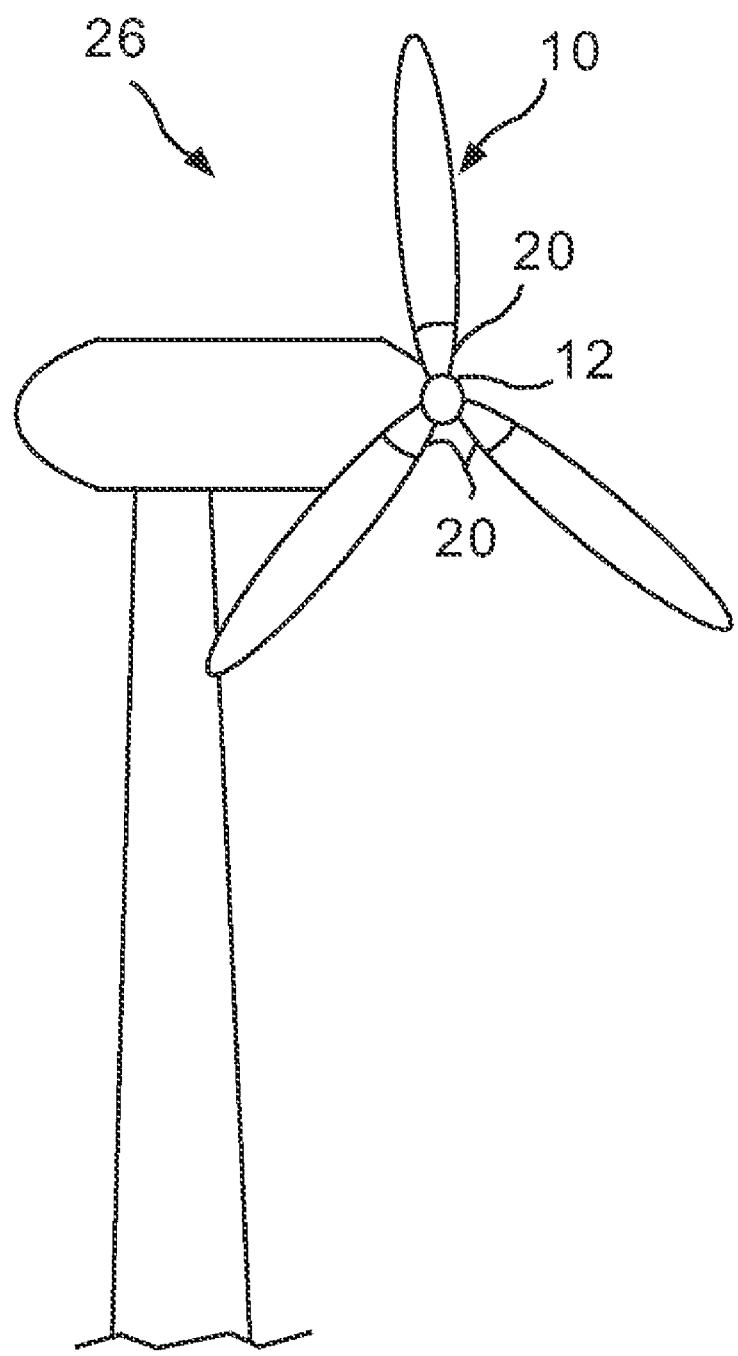
FIG. 1 is a drawing of a wind turbine configuration of the present invention.
Figure 2:
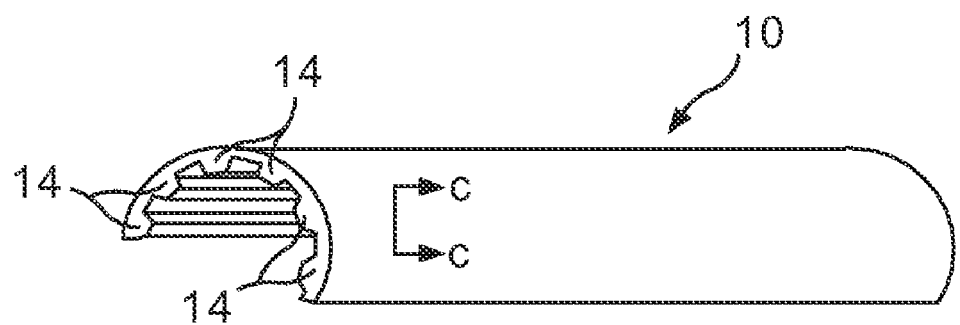
FIG. 2 is a drawing of a blade configuration having an integrally stiffened shell with a portion of the shell cut away for clarity.
Figure 3:
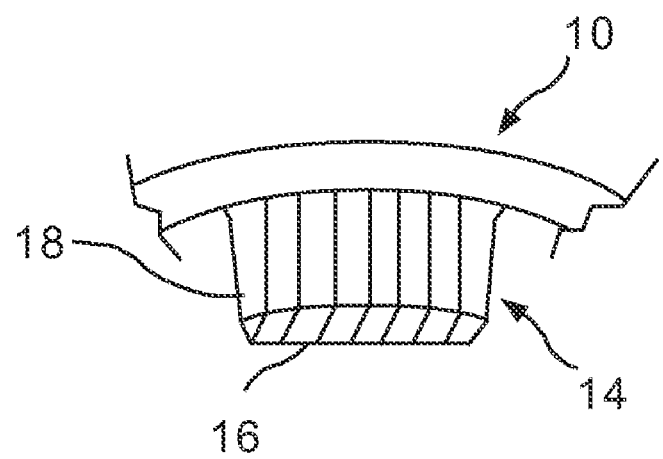
FIG. 3 is a drawing of a slice of the shell of FIG. 2 at C-C.

Thus, and referring to FIG. 1, some configurations of the present invention provide a blade 10 for a rotor 12. Referring to FIGS. 2 and 3, blade 10 has integral stiffeners 14 with either or both unidirectional caps 16 configured to carry blade 10 bending loads in axial tension or webs 18 to carry transverse shear resulting from blade 10 bending. Unidirectional caps 16 can be carbon/epoxy caps 16 configured to carry blade bending loads in axial tension. Webs 18 can be balsa wood webs 18 to carry transverse shear resulting from blade 10 bending.

Figure 4:
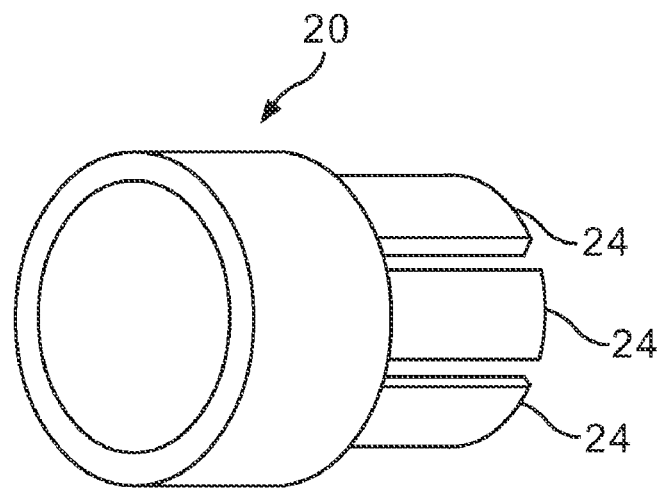
FIG. 4 a drawing of a configuration of blade/hub joint suitable for use with the blade configuration shown in FIG. 2.
Figure 5:
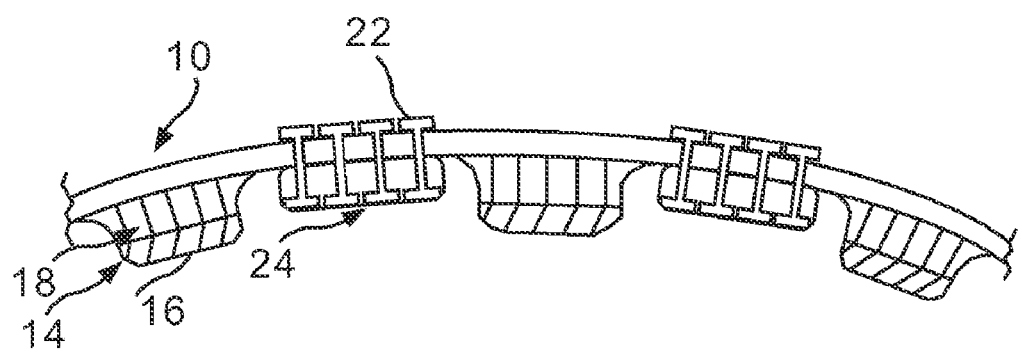
FIG. 5 is a drawing showing one method for attaching the coupling of FIG. 4 to the blade of FIG. 2.
Figure 5:
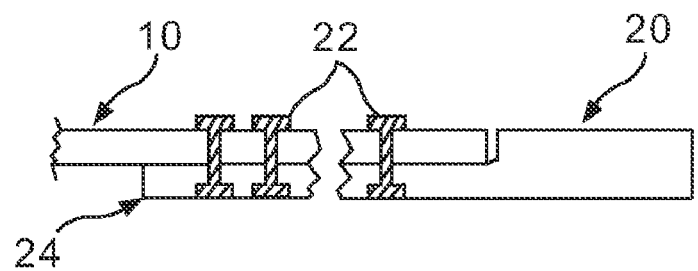

In some configurations and referring to FIGS. 1 and 4, a blade/hub attachment coupling 20 configured to transfer load from blade 10 to a supporting hub 12 is provided. Blade/hub attachment 20 can be comprised of metal, for example, and can have fingers 24 configured to transfer a load from blade 10 to supporting hub 12. One exemplary method for attaching of blade 10 to coupling 20 is shown in FIG. 5. In this method, bolts 22 are used to affix coupling 20 to blade 10. Bolts 22 transfer load from the laminated composite blade 10 by shear, reducing the likelihood of a fastener pull-through failure mechanism.

Figure 6:
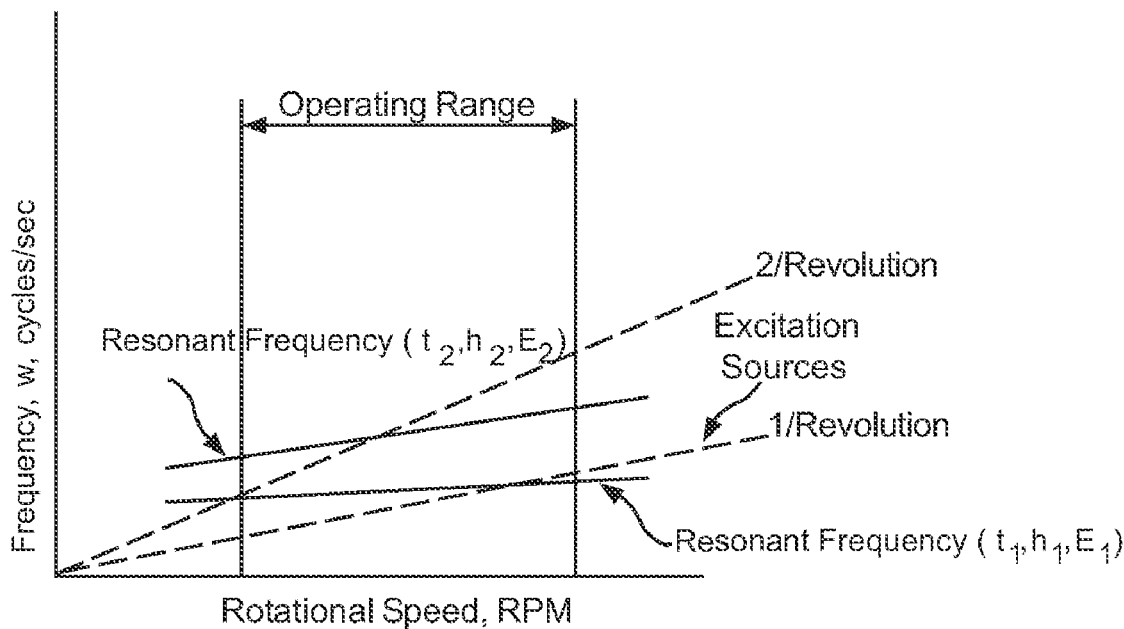
FIG. 6 is a graph showing resonant frequency as a function of cap depth for some configurations of the present invention.
Figure 7:
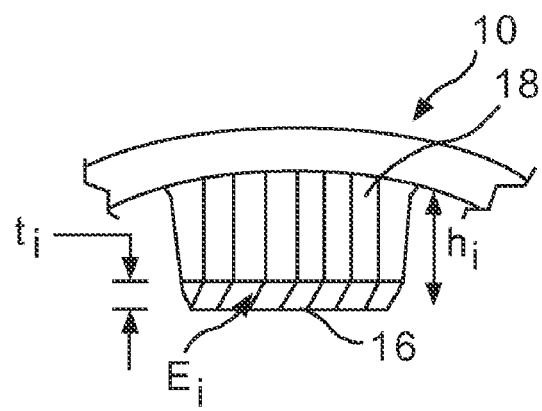
FIG. 7 is an illustration showing dimensions on the blade configuration used in the graph of FIG. 6.

Also in some configurations, blade 10 includes stiffeners 14 and also a cap 16. In some of these configurations, stiffener 14 height, cap 16 thickness, and/or cap 16 material is/are selected to provide a predetermined strength, stiffness, or both. Cap 16 material can be a material selected from high, medium, or low modulus carbon/epoxy. Unidirectional carbon/epoxy caps 16 in some configurations are provided configured to carry blade bending loads in axial tension, and balsa wood webs 18 are provided in some configurations to carry transverse shear resulting from blade 10 bending. For example, and referring to FIGS. 5 and 6, resonant frequencies can be adjusted by adjusting cap 16 depth ($h_i$) cap 16 elastic modulus ($E_i$) and/or cap thickness ($t_i$). Adjustment of these variables can tune resonant frequencies away from critical excitation sources in the operating speed range of a blade or improve frequency margins of safety.

Blade 10 configurations of the present invention are not limited to particular applications. By way of example only, however, and referring again to FIG. 1, they are well suited for use in wind turbines 26. Wind turbine 26 configurations can include a generator (not shown in the figures), a hub 12, and at least one blade 10 of a configuration described herein. For example, blade or blades 10 can have integral stiffeners 14 with at least one of unidirectional caps 16 configured to carry blade 10 bending loads in axial tension or webs 18 to carry transverse shear resulting from blade 10 bending.

It will thus be appreciated that many configurations of the present invention reduce blade weight, and are particularly useful in reducing blade weight in wind turbines at tops of towers. Many configurations of the present invention also give designers a plurality of ways to adjust the strength and stiffness of blades to achieve improved structural performance.

While the invention has been described in terms of various specific embodiments, those skilled in the art will recognize that the invention can be practiced with modification within the spirit and scope of the claims.

What is claimed is:

1. A rotor blade comprising:
   a substantially hollow blade skin;
   at least one stiffener formed integral with an inner surface of said blade skin; and at least one of a unidirectional cap coupled to said blade skin and configured to carry blade bending loads in axial tension and a web coupled to said blade skin and configured to carry transverse shear resulting from blade bending.

2. A rotor blade in accordance with claim 1 comprising a unidirectional carbon/epoxy cap configured to carry blade bending loads in axial tension.

3. A rotor blade in accordance with claim 1 comprising a balsa wood web configured to carry transverse shear resulting from blade bending.

4. A rotor blade in accordance with claim 1 comprising a unidirectional carbon/epoxy cap configured to carry blade bending loads in axial tension and a balsa wood web configured to carry transverse shear resulting from blade bending.

5. A rotor blade in accordance with claim 1 further comprising a blade/hub attachment coupling configured to transfer load from said rotor blade to a supporting hub.

6. A rotor blade in accordance with claim 5 wherein said blade/hub attachment is formed from metal and comprises fingers configured to transfer the load from said rotor blade to said supporting hub.

7. A rotor blade in accordance with claim 1 wherein said at least one stiffener has a height, said unidirectional cap comprises a material having a thickness, and wherein at least one of the stiffener height, the cap thickness, and the cap material provides at least one of a predetermined strength and a predetermined stiffness.

8. A rotor blade in accordance with claim 7 wherein said cap material comprises at least one of a high modulus carbon/epoxy, a medium modulus carbon/epoxy, and a low modulus carbon/epoxy.

9. A rotor blade in accordance with claim 7 further comprising a unidirectional carbon/epoxy cap configured to carry blade bending loads in axial tension.

10. A rotor blade in accordance with claim 7 further comprising a balsa wood web configured to carry transverse shear resulting from blade bending.

11. A wind turbine comprising:
a generator;
a hub; and
a blade coupled to said hub, said blade comprising:
a substantially hollow blade skin;
a stiffener formed integrally with an inner surface of said blade skin; and
at least one of a unidirectional cap coupled to said blade skin and configured to carry blade bending loads in axial tension and a web coupled to said blade skin and configured to carry transverse shear resulting from blade bending.

12. A wind turbine in accordance with claim 11 wherein said blade comprises a unidirectional carbon/epoxy cap configured to carry blade bending loads in axial tension.

13. A wind turbine in accordance with claim 11 wherein said blade comprises a balsa wood web configured to carry transverse shear resulting from blade bending.

14. A wind turbine in accordance with claim 11 wherein said blade comprises a unidirectional carbon/epoxy cap configured to carry blade bending loads in axial tension and a balsa wood web configured to carry transverse shear resulting from blade bending.

15. A wind turbine in accordance with claim 11 further comprising a blade/hub attachment coupling configured to transfer a load from said blade to said hub.

16. A wind turbine in accordance with claim 15 wherein said blade/hub attachment is formed from metal and comprises fingers configured to transfer the load from said blade to said hub.

17. A wind turbine in accordance with claim 11 wherein said stiffener comprises a height and said unidirectional cap comprises a thickness and a material, and wherein at least one of said stiffener height, said cap thickness, and said cap material provides at least one of a predetermined strength and a predetermined stiffhess.

18. A wind turbine in accordance with claim 17 wherein said cap material comprises at least one of a high modulus carbon/epoxy, a medium modulus carbon/epoxy, and a low modulus carbon/epoxy.

19. A wind turbine in accordance with claim 17 wherein said blade further comprises a unidirectional carbon/epoxy cap configured to carry blade bending loads in axial tension.

20. A wind turbine in accordance with claim 17 wherein said blade further comprises a balsa wood web configured to carry transverse shear resulting from blade bending.

* * * * *